Nov. 23, 1965   L. L. FIELDS ETAL   3,218,869
SAMPLING APPARATUS

Filed Feb. 5, 1962   2 Sheets-Sheet 1

LAWRENCE L. FIELDS
GLENN R. JOHNS
INVENTORS

BY Adams, Forward and McLean
ATTORNEYS

LAWRENCE L. FIELDS
GLENN R. JOHNS
INVENTORS

United States Patent Office 3,218,869
Patented Nov. 23, 1965

3,218,869
SAMPLING APPARATUS
Lawrence L. Fields and Glenn R. Johns, Independence, Kans., assignors to Sinclair Research, Inc., a corporation of Delaware
Filed Feb. 5, 1962, Ser. No. 171,104
4 Claims. (Cl. 73—425.4)

Our invention relates to the sampling of fluids and semisolid materials and in particular provides a device for the sampling of sediment deposits within storage containers and the like.

In a bulk container, for petroleum products, for instance, it is important to determine the depth of semisolids or viscous liquids, i.e. sludge and sediment, and to locate the interface between such materials and the fluids lying above them, and it is desirable to obtain samples of such materials as a function of depth. Standard samplers of the variety contemplated here such as grain samplers, "tank thieves," "oil thieves," bottle samplers and the like have not been designed to locate such interfaces, to segregate strata, or to measure the depth of strata accurately. Some specialized samplers having separate compartments spaced along their length permitting location of such interfaces have been designed; but attachments for closing such samplers from a remote position have been inadequate and the structure of such devices have been such that removal of samples from such samplers has been relatively difficult. The mechanisms for closing such samplers from remote positions have been inadequate to prevent rotation of the samplers in response to torque placed upon handles and connecting linkages. There is a need for durable and dependable mechanisms for opening and closing such devices in order to minimize expenditures for time lost and maintenance costs.

Our invention provides a device for measuring the depth of material in a storage vessel.

Our invention also provides a device for determining the position of an interface between various layers of material stored in a container, and particularly between sediment and other fluids in an oil tank.

In addition, our invention provides a sampling device for obtaining samples segregated as a function of displacement from materials stored in a container.

Another purpose of our invention is to provide a multi-chambered sampling device operable at a point remote from the material to be sampled.

Furthermore, our invention has as an object providing such a sampler distinguished by durable and dependable construction including positive acting mechanisms for closing the chambers of the sampler which require minimum maintenance and repair costs.

Our invention is a device for sampling including an elongated hollow body, e.g. a shell of semicylindrical cross section, a number of partitions attached transversely to the hollow body along its length, and compartments defined between the walls of the elongated hollow body and the partitions. A shaft is rotatably mounted at the ends of the hollow body and a number of aligned hollow cups are rigidly attached to the shaft. The cups are so sized and mounted as to be freely rotatable within the compartments and as to be rotatable to a closed position in which the cups and the compartments form a number of closed containers. Preferably, means for closing the device are included such as a first handle for retaining the hollow body in a relatively fixed position and a second handle attached to the shaft for rotating it relative to the hollow body. When a large container or tank is to be sampled, a first extension is attached between the hollow body and the first handle and a second extension is attached between the shaft and the second handle to permit closure of the device from a remote position. Preferably, the second extension is located inside the first extension, the first extension being hollow, and the two extensions being concentric.

A description of a practical application of our invention disclosing further aspects and objects of our invention follows with reference to the appended drawings in which.

Figure 1:
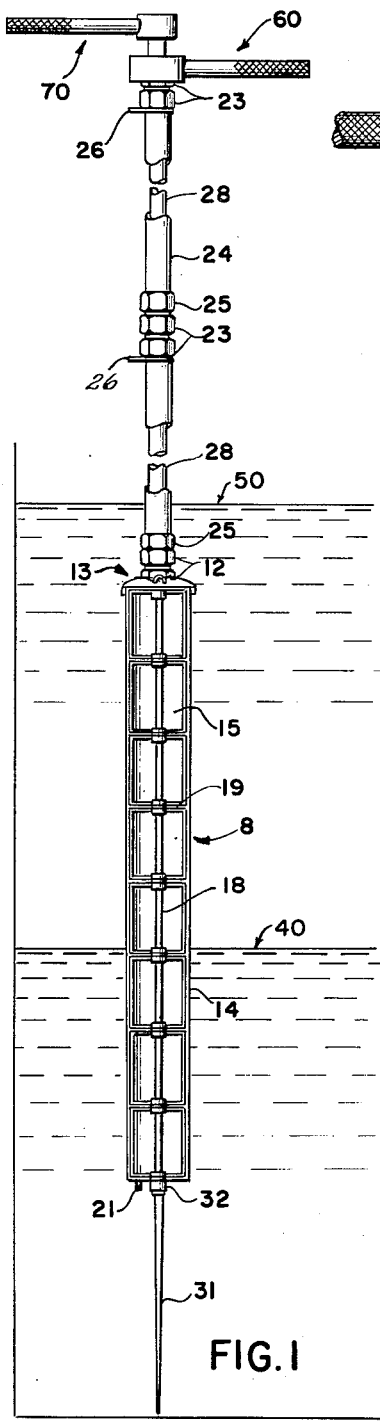
FIGURE 1 is an elevational assembly view of a device constructed according to our invention showing fragments of two extensions between the sampling chamber and handles for closure of the sampling chamber.

An "oil thief" sampling device 8, which is shown in FIGURE 1 located in an oil tank with the sediment level 40 and oil level 50 indicated, includes a semicylindrical chamber 14 divided by partitions 19 containing a number of cups 15 mounted on a shaft 18 with extensions attached to the chamber 14 and the shaft 18 and handles attached to the extensions for the purpose of closing the "oil thief" 8.

Figure 2:
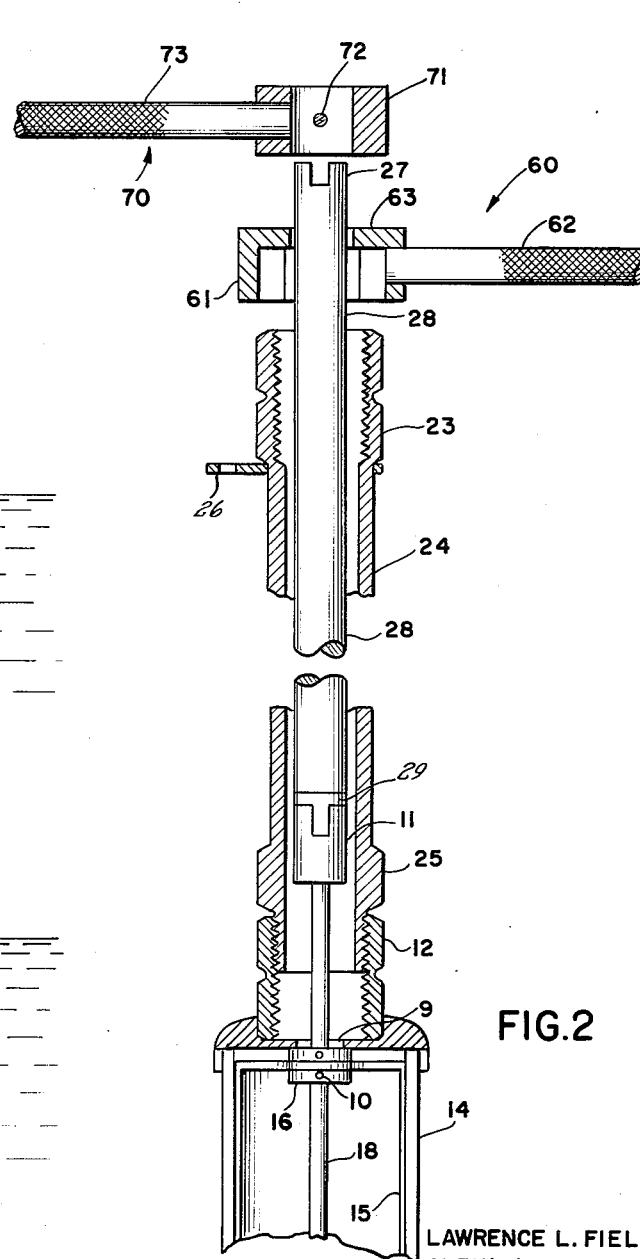
FIGURE 2 is an enlarged fragmentary sectional view of one extension shown in FIGURE 1 with the handles raised from the extension and sectioned for convenience of illustration, and with the extension assembled to a fragment of the sampling chamber.
Figures 3, 4:
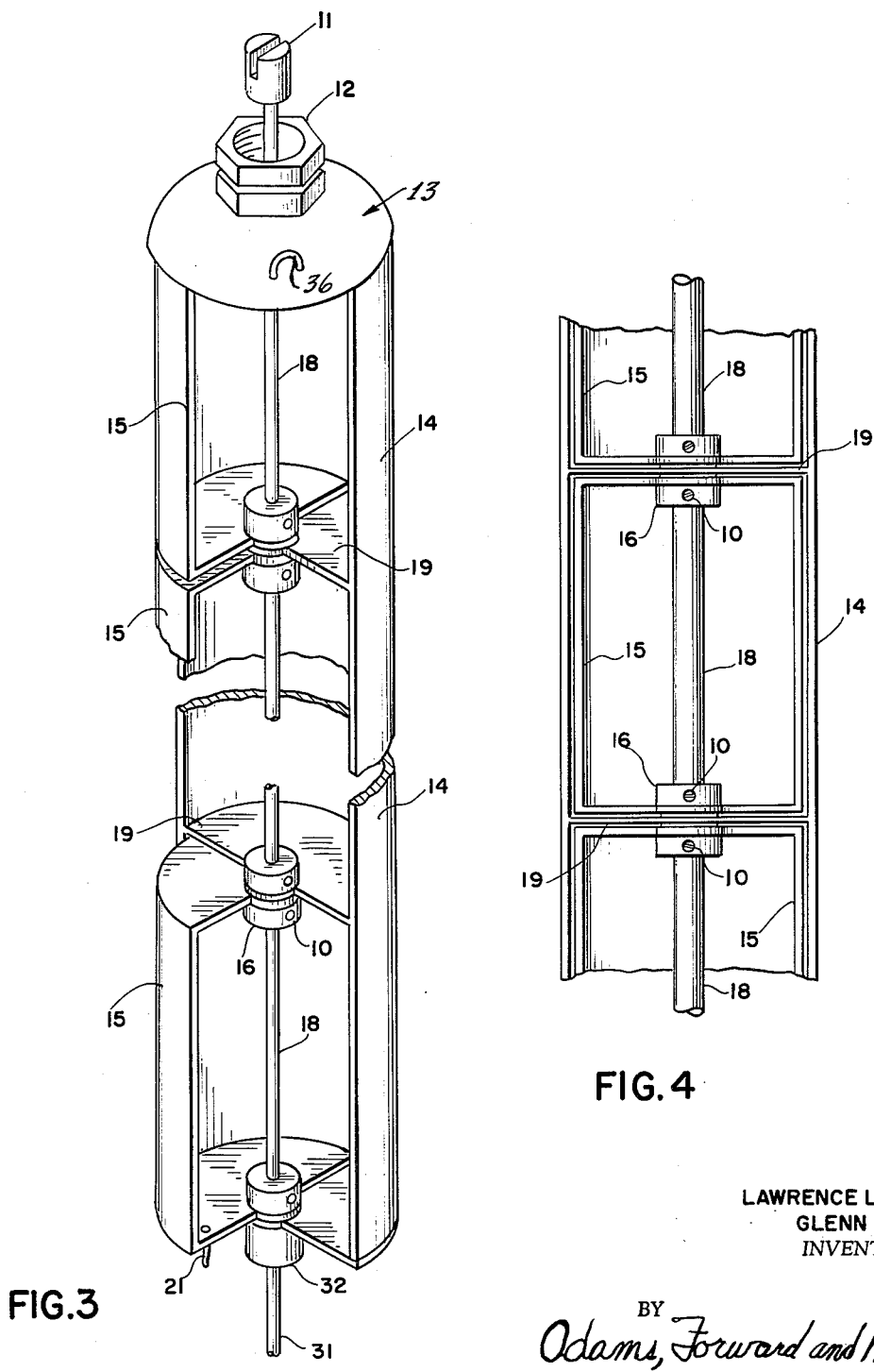
FIGURE 3 is a fragmentary oblique elevation of the sampling chamber in partially closed position.
FIGURE 4 is a fragmentary elevation of the sampling chamber.

The semicylindrical chamber 14 which is divided by partitions 19 into compartments as shown in FIGURES 2, 3 and 4 has a concentric shaft 18 mounted to its ends and bearing upon the partitions 19. A number of cups 15 having outer dimensions conforming to the dimensions of the compartments and having concentric rings 16 fixed permanently to each end of the cups 15 are mounted by rings 16 which are affixed to the shaft 18 by setscrews 10. The lowest cup 15 shown in FIGURES 1 and 3 has a stop pin 21 attached to its end extending below the end of the semicylindrical chamber 14.

On the upper end of the chamber 14 is permanently fixed a circular cover or cap 13 having an opening 9 concentric with the shaft 18 and the chamber 14, and a hexagonal concentrically tapped fitting 12 is affixed to cap 13. The shaft extends through the opening 9 and the tapped fitting 12 terminating in a cylindrical horizontally grooved shaft end 11 shown in FIGURES 2 and 3.

A first handle 60 suitable for engaging with the tapped fitting 12 has a knurled portion 62, a hollow annular portion 61 with hexagonal inner cross section and an annular cap 63 with an inner radius greater than the radius of the grooved end 11 and less than that of the tapped fitting 12.

A second handle 70 suitable for engaging with the shaft end 11 has a knurled portion 73, an annular slide 71 with an inner diameter slightly greater than the outer diameter of the shaft end 11 and a horizontal pin stop 72 suitable for fitting within the groove in top of the shaft end 11 attached and disposed along a diameter of the annular slide 71.

The two handles may then be attached to the tapped fitting 12 and the grooved shaft end 11, but if the tank to be sampled is so deep that the shaft end 11 and the tapped fitting 12 would be inaccessible, then extensions for each of these parts will be necessary if closure is to be effected. Suitable extensions are shown in FIGURES 1 and 2 with the two pieces shown in FIGURES 1 and 2 indicating that several may be used because of the interchangeable end structure illustrated.

An outer extension tube 24 fitted at its lower end with a hexagonal end fitting 25 threaded to fit the thread of the tapped fitting 12 is assembled to it. The opposite end of the outer tube 24 has an annular portion 23 identical to the tapped fitting 12 in all respects in order that another identical outer extension tube 24 may be assembled to it.

Insertable through the hollow outer extension tube 24 is an inner extension shaft 28 having a tongued end 29 insertable into the groove in the shaft end 11. The extension shaft 28 is terminated at its opposite end by an extension shaft end 27 grooved in the same manner as the shaft end 11 and is long enough with respect to the hollow outer tube 24 to extend above it.

Closure of the sampling device 8 is effected by holding the first handle 60 in a fixed position and exerting torque upon the second handle 70 to twist the shaft 18 and close the cups 15 upon the compartments forming a number of closed containers trapping any solid or semisolid material.

When an extension is to be attached, a rope, a chain, or the like should be attached to the sampler 8 at loop 36 on circular cover 13 or at bracket 26 on an outer extension tube 24, thereby holding the apparatus in a convenient position partially inserted into the container to be sampled. When the apparatus reaches the bottom of the container, the handles 60 and 70 are attached fitting as described above and the sampler is closed holding a sample of material surrounding the device 8.

As shown in FIGURE 1 a rod extension 31 may be attached to the bottom of the semicylindrical outer shell 14 by means of a tapped fitting 32 or the like. This attachment will permit measurement of the position of interfaces a greater distance above the bottom of the container than the length of the sampler 8. Variable lengths of such end extensions can be provided when desirable, e.g. in applications of this device to grain sampling and the like when spot samples are desired as a function of depth throughout the grain container.

A successful test was made of a sampler designed in accordance with our invention. The main body 14 was a hollow semicylinder 32" long and 2½" in diameter containing eight equally sized compartments or pockets between partitions. The handle used included four foot sections of ½" copper tubing inside ¾" copper tubing with the inner tubing having solid alternately tongued and grooved closed ends. The base extensions on the bottom of the main body used for measuring deeper accumulations of semisolid material were ⅜" brass rods from one to three feet in length.

This sampler is suitable for use in measuring any semisolid stored in large bulk quantities.

We claim:
1. Apparatus for sampling comprising an elongated hollow trough-shaped body having an opening along the length thereof, a plurality of partitions attached at intervals to said body in the hollow thereof to form a plurality of compartments in said hollow of the body along the length thereof, said partitions extending transversely across said open side and having an area at least equal to the area of the hollow of said body as defined by the wall of said body and an imaginary line drawn from one longitudinal edge of said opening through the center of said body to other longitudinal edge of said opening, a plurality of cups each fitted between two respective ones of said partitions, fastening means rotatably mounting said cups, said cups being of such dimensions as to fit within said compartments in an open position and being rotatable without binding about the axis of said fastening means to a closed position to form with said compartments a plurality of substantially closed chambers having significantly larger volumes than the volumes of said compartments when said cups are in said open position, first means attached to said apparatus for retaining said elongated hollow body in fixed position and second means attached to said fastening means for rotating said cups.

2. Apparatus as defined in claim 1 wherein said partitions have partition lips and said cups have cup lips, said partition lips being shaped to overlap and close and mate with said cup lips in said closed position.

3. Apparatus as defined in claim 1 wherein said partitions are substantially semi-circular.

4. Apparatus for sampling viscous and semisolid materials comprising an elongated hollow cylindrical body having a longitudinal opening along one side thereof, a shaft rotatably mounted on the ends of said elongated hollow body proximate the center thereof, a plurality of partitions attached at intervals to said body in the hollow thereof to define a plurality of compartments in said hollow along the length thereof, said partitions being disposed substantially normal to said shaft and being commensurate in area with the hollow of said body as defined by the wall of said body and an imaginary line drawn from one longitudinal edge of said opening through said center to the other longitudinal edge of said opening, a plurality of cups affixed to said shaft, each of said cups being associated with a different one of said hollow compartments and effectively separated by said partitions, said cups having openings with equal angular disposition with respect to said shaft, each of said cups having external dimensions adjacent the opening thereof substantially equal to the internal dimensions of the opening of the related compartment permitting closure of each of said cups with the related one of said compartments at a predetermined angular position of said shaft, and said cups having radial dimensions permitting rotation of each of said cups within the compartment related thereto preventing binding of said cups with the walls of said compartments for all angular positions of said shaft, the volume enclosed by said cups and compartments when the shaft is rotated to said predetermined angular position being significantly larger than the volume defined by said compartments alone.

References Cited by the Examiner
UNITED STATES PATENTS

| 230,121 | 7/1880 | Frost | 73—425.2 |
| 732,059 | 6/1903 | Dyer | 73—425.4 |
| 855,849 | 6/1907 | Gray | 73—425.2 |
| 902,049 | 10/1908 | Bonnell | 73—425.3 |

FOREIGN PATENTS 484,331 12/1953 Italy.

RICHARD C. QUEISSER, *Primary Examiner.*